United States Patent
Sherman et al.

(10) Patent No.: US 7,564,826 B2
(45) Date of Patent: Jul. 21, 2009

(54) APPARATUS FOR AND METHOD OF SYNCHRONIZATION AND BEACONING IN A WLAN MESH NETWORK

(75) Inventors: Itay Sherman, Ra'anana (IL); Shantanu Kangude, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 11/424,235

(22) Filed: Jun. 15, 2006

(65) Prior Publication Data

US 2007/0014269 A1    Jan. 18, 2007

Related U.S. Application Data

(60) Provisional application No. 60/698,816, filed on Jul. 13, 2005.

(51) Int. Cl.
    H04Q 7/24    (2006.01)
(52) U.S. Cl. .................. 370/338; 370/401; 370/444; 370/448
(58) Field of Classification Search .................. 370/338, 370/401, 352, 412, 389, 311, 348, 444, 448; 455/456.1, 403.2, 434, 556.2, 547
See application file for complete search history.

(56) References Cited

U.S. PATENT DOCUMENTS

| | | | |
|---|---|---|---|
| 6,934,870 B1 * | 8/2005 | Amos ........................ 713/501 |
| 7,224,970 B2 * | 5/2007 | Smith et al. ................ 455/434 |
| 7,280,517 B2 * | 10/2007 | Benveniste .................. 370/338 |
| 7,324,824 B2 * | 1/2008 | Smith et al. .............. 455/456.1 |
| 2002/0089994 A1 * | 7/2002 | Leach et al. ................ 370/412 |
| 2006/0009246 A1 * | 1/2006 | Marinier et al. ............. 455/502 |
| 2006/0203850 A1 * | 9/2006 | Johnson et al. ............. 370/503 |
| 2008/0194201 A1 * | 8/2008 | Sinivaara et al. ........... 455/41.2 |

OTHER PUBLICATIONS

IEEE 802.11 Part 11: Wireless LAN Medium Access Control (MAC) and PHY Specifications, Section 11.1, Aug. 20, 1999.

* cited by examiner

*Primary Examiner*—CongVan Tran
(74) *Attorney, Agent, or Firm*—Steven A. Shaw; W. James Brady; Frederick J. Telecky, Jr.

(57) ABSTRACT

A novel and useful synchronization mechanism that functions to provide a uniform time base for mesh points in a WLAN mesh based network. The invention enables timing synchronization to a common reference clock base by advertising the common TSF within beacon transmissions. All MPs in a mesh share a common DTIM interval. The synchronization mechanism enables the mesh points to avoid collisions in the generation and transmission of beacons. The TBTT offsets of the current MP and its neighbors are advertised in beacons so that neighboring MPs that hear the beacons can select non-overlapping TBTT offsets. Each MP receives one or more beacons from its neighbors and compares the timing of its neighbors to that of itself and adopts the highest TSF (i.e. the fastest) in the mesh. Eventually, all MPs in the mesh will adjust their timing to that of the MP with the fastest clock. The reception of beacons by MPs from its neighbors is also advertised. This allows for MPs to verify that the beacons they send are actually heard and are not in collision with beacon transmissions of other MPs.

21 Claims, 7 Drawing Sheets

APPARATUS FOR AND METHOD OF SYNCHRONIZATION AND BEACONING IN A WLAN MESH NETWORK

REFERENCE TO PRIORITY APPLICATION

This application claims priority to U.S. Provisional Application Ser. No. 60/698,816, filed Jul. 13, 2005, entitled "Synchronization and Beacon Strategy for a WLAN Mesh Network", incorporated herein by reference in its entirety.

FIELD OF THE INVENTION

The present invention relates to the field of data communications and more particularly relates to a synchronization and beacon mechanism to achieve uniform timing and collision avoidance in a wireless LAN (WLAN) mesh network.

BACKGROUND OF THE INVENTION

WLANs and the IEEE 802.11 Standard

Wireless Local Area Networks (WLANs) are well known in the art. Over the past few years, wireless networking has exploded with numerous products commercially available from a myriad of manufacturers. The standards governing WLAN networking products are defined by a suite of specifications issued by the IEEE and known as the IEEE 802.11 standard, incorporated herein by reference in their entirety. The standards define the operation of both the radio PHY layer and the MAC layer including a synchronization mechanism. A brief overview of the synchronization mechanism specified by the standard and used to provide a uniform time base in legacy 802.11 infrastructure type networks is presented below for the benefit of the reader.

A timing synchronization function (TSF) is operative to keep the timers of all the stations (STAs) in the same basic service set (BSS) synchronized. Each station maintains its own local TSF timer. In a conventional WLAN infrastructure network, the access point (AP) is the timing master and is operative to implement the timing synchronization function (TSF). The AP periodically transmits special frames called beacons that contain a copy of its TSF timer. The beacons are used by the other STAs in the BSS to synchronize to the AP. A STA always accepts the timing information received in a beacon from the AP servicing its BSS. If the TSF timer of a STA is different from the timestamp in the received beacon, the receiving STA sets its local timer to the received timestamp value.

For ad hoc networks, the TSF in an Independent BSS (IBSS) is implemented using a distributed algorithm that is performed by the members of the BSS. Each STA in the BSS transmits beacons in accordance with an algorithm defined in the 802.11 standard. Each STA in the IBSS adopts the timing received from any beacon or probe response that has a TSF value later than its own TSF timer. STAs expect to receive beacons at a nominal rate. The interval between beacon transmissions is defined by the aBeaconPeriod parameter of the STA. A STA sending a beacon sets the value of the timestamp to be equal to the value of the TSF timer of the STA at the time that the first bit of the timestamp is transmitted to the PHY plus the transmitting delays of the STA through its local PHY from the MAC-PHY interface to its interface with the wireless medium (i.e. antenna, etc.).

In infrastructure networks, the AP defines the timing for the entire BSS by transmitting beacons in accordance with the aBeaconPeriod attribute within the AP. This define a series of target beacon transmission times (TBTTs) exactly aBeaconPeriod time units apart. Time zero is defined to be a TBTT with the beacon being a delivery traffic indication message (DTIM) and transmitted at the beginning of a contention fee period (CFP). At each TBTT, the AP schedules a beacon as the next frame for transmission. If the carrier sense mechanism determines that the medium is busy, the AP delays the actual transmission of the beacon in accordance with the basic medium access defined in the standard. The beacon period is adopted by all STAs when joining the BSS.

Beacon generation in an IBSS ad hoc network is a distributed process. The beacon period is included in Beacon and Probe Response frames and STAs adopt that bacon period when joining the IBSS. All members of the IBSS participate in beacon generation. Each STA maintains its own TSF timer that is used for aBeaconPeriod timing. The beacon interval within an IBSS is established b the STA that instantiates the IBSS. This defines a series of TBTTs exactly aBeacnPeriod time units apart. Time zero is defined to be a TBTT. At each TBTT the STA (1) suspends the decrementing of the backoff timer for any pending non-beacon or non-ad hoc traffic indication (ATIM) transmission; (2) calculates a random delay uniformly distributed in the range between zero and twice aCWmin×aSlotTime; (3) waits for the period of the random delay, decrementing the random delay timer using the same algorithm as for backoff; (4) cancels the remaining random delay and the pending beacon transmission, if a beacon arrives before the random delay timer expires, and the ATM backoff timer resumes decrementing; and (5) sends a beacon if the random delay timer expires and no beacon has arrived during the delay period.

Note that in an infrastructure network, the STAs always adopt the timer in a beacon or probe response from the AP in their BSS. In an IBSS, a STA always adopts the information in the contents of the beacon or probe response when it contains a matching service set identifier (SSID) and the value of the timestamp is later than the TSF timer of the STA (i.e. it adopts the timing of the fastest clock in the network).

Wireless mesh networks have been proposed as an extension of the existing 802.11 standard. The specifications of such mesh networks have been defined in the draft extended service set (ESS) standard IEEE 802.11s ESS Mesh Networking vD0.01. The networks described in this standard make use of layer-2 mesh path selection and forwarding (that is, a mesh network that performs routing at the link layer). Mesh networks have advantageous properties in terms of robustness, range extension and density. Some disadvantages of mesh networking topologies include power consumption and security.

In most wireless local area network (WLAN) deployments today, there is a clear distinction between the devices that comprise the network infrastructure and the devices that are clients that simply use the infrastructure to gain access to network resources. The most common WLAN infrastructure devices deployed today are standard 802.11 access points (APs) that provide a number of services, including support for power saving devices (i.e. traffic buffering), authentication services and access to the wired network (e.g., the Internet). APs are usually directly connected to a wired network (e.g., 802.3) and simply provide wireless connectivity to client devices rather than utilizing wireless connectivity themselves. Client devices, on the other hand, are typically implemented as simple 802.11 stations (STAs) that must associate with an AP in order to gain access to the network. These simple STAs are dependent on the AP with which they are associated to communicate.

An example legacy WLAN deployment model and device classes are illustrated in FIG. 1. The example network, generally referenced 10, comprises a plurality of legacy wireless devices 18 that function as access points. Each access point is coupled wirelessly via RF to one or more wireless devices 20 that function as STAs. These devices may comprise handheld PDAs, laptop computers, etc. The access points are all connected to a wired network 16 which may be connected to a wide are network (WAN) such as the Internet 12 via a router 14.

Many of the devices considered for use in WLANs can support much more flexible wireless connectivity. In a wireless mesh network, dedicated infrastructure class devices such as APs can establish peer-to-peer wireless links with neighboring APs to establish a mesh backhaul infrastructure, without the need for a wired network connection to each AP. Moreover, in many cases devices traditionally categorized as clients can also establish peer-to-peer wireless links with neighboring clients and APs in a mesh network. In some cases, these mesh-enabled client devices can provide the same services as APs to help legacy STAs gain access to the network. Thus, the proposed mesh network extensions blur the lines between infrastructure and client devices in some deployment scenarios.

Wireless nodes are divided into two major classes: (1) mesh class nodes which are nodes capable of supporting mesh services; and (2) non-mesh class nodes which include simple client STAs. Mesh class nodes can optionally also support AP services and may be managed or unmanaged. Mesh services can be implemented as a logical MAC interface that is independent of the legacy 802.11 MAC interface. Thus, a single device can play the roles of both a mesh point and an AP or the roles of both a mesh point and a legacy STA. An example WLAN mesh network is illustrated in FIG. 2. The example network, generally referenced 30, comprises a plurality of mesh points, 32, mesh access points 34 and legacy STAs 36. Devices that support mesh services are referred to as mesh points (MPs). Mesh access points (MAPs) are MPs that are also access points.

Note that a mesh point may be either a dedicated infrastructure device or a user device that is able to fully participate in the formation and operation of the mesh network. A special type of mesh point is the mesh access point (MAP), which provides AP services in addition to mesh services. Simple STAs associate with MAPs to gain access to the mesh network. Simple STAs do not participate in WLAN mesh services such as path selection and forwarding, etc. Mesh points may operate at various levels of functionality. Not all mesh points may need to use full mesh services. Services like routing may be used partially or not at all.

Lightweight mesh point operation includes minimal functionality mesh points. They do not use or provide distribution system (DS) and congestion control services. They do, however, support and provide all other mesh services mandatory for a non-AP mesh point. Thus, they are able to communicate only with their neighbors. Such MPs can have extremely lightweight implementation.

The standard also provides support for power saving devices in a WLAN mesh network. The need for power save in a mesh environment depends on specific scenarios of operation. In certain scenarios where the MPs are all MAPs or only carry backbone traffic, the devices may not be expected to be power constrained. Specifically MAPs are expected to be awake all the time. A power save can be useful feature can be useful in scenarios with lightweight and non-forwarding MPs. Specifically, MPs that are lightweight or non-forwarding may be power constrained as well. Thus, power saving in MPs is optional.

Some aspects of optional power save support are as follows. The capability to support power save is advertised by MPs. In case a neighbor of an MP does not support power save, the MP may take one of two approaches. It may choose not to communicate with that particular neighbor and still go into power save or it may choose to not use the power save mechanism and continue communicating with that neighbor. An MP supporting power save may reject an association attempt from another MP if this MP is not supporting power save. MPs supporting power save may operate in power save mode only if all the MPs they are associated with support power save. Lightweight MPs communicate with neighbors without association. If they choose to operate in power save mode, they are aware that communication with non supporting neighbors is not possible.

In certain scenarios, devices may also choose to operate in STA mode and use the legacy power save service through an AP. Such a scenario is particularly attractive in the case power save support from mesh point neighbors is not available, but a MAP is available in vicinity. It should be noted that the choice of mesh versus non-mesh device class or role can be made dynamic; that is, a device such as a camera could configure itself as a mesh device when AC powered, but may configure itself as a simple client STA when operating from a battery.

Mesh Synchronization

Currently available oscillators are relatively stable and therefore frequency clock synchronization is not required. Synchronization once every few tens of second typically good enough. Such a level of synchronization is extremely easy to achieve using already existing WLAN implementations, thus enabling a wide array of services in a mesh network.

MPs following a common reference time base (that may potentially be floating) is required in order to facilitate multiple mesh services. A scheme that limits the drift at any point in time between any pair of neighbor nodes is good enough for most simple applications requiring common time bases. Operation of a mesh on multiple radios may require this level of synchronization in order to facilitate a coordinated scheduled frequency change, a scheduled data transfer, etc. In addition, power save schemes also require some sort of synchronization in order to facilitate coordinated wakeups of different MPs in order to communicate with each other.

Moreover, any further expansion to the 802.11 standard that involves any scheduled operation such as scheduled/deterministic access will likely also require some type of synchronization. Synchronization is also required in order to effectively deal with potential beaconing collisions.

While MAPs need to beacon periodically at every TBTT, MPs that are not APs may be specified not to beacon with that frequency. Beaconing by every MP, however, is possible and probabilistically at least every few (or tens of) beacon periods helps improve network performance. A block diagram illustrating beacon transmission in a busy network is shown in FIG. 3. Distributed beaconing approaches where all MPs attempt to regularly transmit beacons is also required in order to support several mesh services. Several examples of such mesh services include the following:

1. Initial discovery is facilitated by the distributed beaconing approach. MPs that wish to join a mesh can discover an existing mesh and its configuration and capabilities by performing passive scanning and monitoring of received beacons. This approach prevents the probe response storm effect that may be associated with the usage of an active scanning technique when used on a densely populated mesh.

2. Dynamic capability change advertising a facilitated by regular and distributed beaconing. This capability will be required to support 802.11b and 802.11g interoperability, power save operation and state discovery and beacon collision avoidance.

The current mesh standard proposal, however, does not specify a beacon transmission methodology. Specifically, the current proposal does not address the issue of beacon collisions between multiple mesh APs (MAPs). Note that IBSS STAs are specified to backoff before transmitting a beacon using AC_VO (i.e. voice traffic queue) outlined in the IEEE 802.11e QoS standard, but APs are not so specified. Rather, APs are expected to transmit beacons without backoff with a frame spacing of point interframe space (PIFS) after clear channel assessment (CCA) if the channel is busy at the target beacon transmission time (TBTT). If the channel is idle at TBTT, APs are expected to beacon at TBTT or as soon as possible after TBTT while making sure that at least a PIFS frame spacing is observed. The IBSS based backoff before beacon transmission scheme and the BSS concept of beaconing without backoff at TBTT are not currently harmonized for the mesh environment. Further, the current mesh standard proposal does not explicitly define the timing synchronization methodology for the mesh network environment.

Current prior art timing synchronization solution proposals addressing this issue suffer from either inherent collisions between beacons or require modifications to the PHY layer in order to support the detection of collisions.

Thus, there is a need for a timing synchronization scheme that is suitable for use in a WLAN mesh based network. The timing synchronization scheme should provide a uniform timing for the entire mesh network and also provide a mechanism for minimizes collisions of beacons between mesh points.

SUMMARY OF THE INVENTION

The present invention provides a solution to the problems of the prior art by providing a novel and useful synchronization mechanism that functions to provide a uniform time base for mesh points in a WLAN mesh based network. The synchronization mechanism also enables the mesh points to avoid collisions in the generation and transmission of beacons. The invention provides a TBTT offset based beaconing technique that helps to avoid and resolve beacon contention. An MP uses the TBTT offset to translate the time instant of its beacon transmission. The TBTT offsets of the current MP and its neighbors are advertised in beacons so that neighboring MPs that hear the beacons can select non-overlapping TBTT offsets. The actual method of selecting the offsets is not critical to the invention and any suitable method for selecting them can be used, within the constraint that a non-overlapping offset be chosen.

In addition to advertising the offsets of an MP and its neighbors, the reception of beacons by MPs from its neighbors is also advertised. This allows for MPs to verify that the beacons they send are actually heard and are not in collision with beacon transmissions of other MPs.

A synchronization scheme is also provided wherein the timing of each MP is advertised in the beacons. Each MP receives one or more beacons from its neighbors and extracts the timing information. It compares the timing of its neighbors to that of itself and adopts the highest TSF (i.e. the fastest) in the mesh. Thus, eventually, all MPs in the mesh will adjust their timing to that of the MP with the fastest clock.

The solution of the present invention provides several advantages. The mechanism provides for multiple MAPs to transmit their beacons without any collisions. It also maintains compatibility to previously defined power save operation and does not require any modifications or additional indications from the existing PHY layer. Further, the mechanism of the present invention minimizes the signaling overhead by utilizing existing information elements (IEs). The mechanism does not require any complex computation or processing resources on the MPs. The neighbor list information element used by the mechanism is already part of the MP database and the values of the fields required to be reported per neighbor are directly derived from its beacon without any further processing.

In addition, the invention simplifies the selection processes of the beacon broadcaster in the power save operation mode for lightweight MPs and aligns it with existing 802.11 standards. The timing synchronization mechanism is relatively simple to implement and uses mechanisms already existing in current WLAN implementations.

The invention enables timing synchronization to a common reference clock base by advertising the common TSF within beacon transmissions. The beaconing interval of each MP can be different but all MPs in a mesh share a common DTIM interval. A common DTIM interval in the network provides rough periodicity that is not strongly tied to beacons. This facilitates all mesh services that may potentially involved periodic action, such as power save, beacon collision avoidance and advanced access schemes for periodically transmitting traffic flow information.

The timing synchronization in a mesh network is similar to the timing synchronization used in IBSS. An MP advertises its own TSF (i.e. the mesh TSF minus its TBTT offset) in its beacons and probe responses. An MP adopts the mesh TSF receive in beacons and probe responses from MPs matching its own mesh ID and having a TSF value higher than its own calculated mesh TSF.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is therefore provided in accordance with the invention, a method of synchronization in a wireless local area network (WLAN) mesh network incorporating a plurality of mesh points and having a mesh delivery traffic indication message (DTIM) period, the method comprising the steps of receiving beacon information messages at a mesh point from one or more neighboring mesh points, extracting beacon information associated with the neighbor mesh points from the beacon information messages, adopting timing of a fastest mesh point in the network in accordance with the beacon information and selecting a beacon interval and DTIM period such that the mesh DTIM period is an integral multiple of the beacon interval.

There is also provided in accordance with the invention, a method of synchronization and collision avoidance in a wireless local area network (WLAN) mesh network incorporating a plurality of mesh points and having a mesh delivery traffic indication message (DTIM) period, the method comprising the steps of receiving beacon information messages at a mesh point from one or more neighboring mesh points, extracting beacon information associated with the neighbor mesh points from the beacon information messages, adopting timing of a fastest mesh point in the network in accordance with the beacon information, verifying receipt of beacons generated by the mesh point at the neighboring mesh points and if beacons generated by the mesh point are not being received at one or more neighboring mesh points, selecting a new target beacon transmission time (TBTT) offset that is not in use by other mesh points such that the mesh DTIM period remains an integral multiple of the beacon interval.

There is further provided in accordance with the invention, a wireless local area network (WLAN) mesh point for use in a WLAN mesh network incorporating a plurality of mesh points and having a mesh delivery traffic indication message (DTIM) period comprising a radio coupled to an antenna for transmitting and receiving radio frequency (RF) signals, a physical layer (PHY) module coupled to the radio, a medium access controller (MAC) coupled to the PHY module and operative to control communications to and from the PHY, the MAC comprising synchronization means for synchronizing the mesh point with the mesh network, the synchronization means comprising means for receiving beacon information messages at a mesh point from one or more neighboring mesh points, means for extracting beacon information associated with the neighbor mesh points from the beacon information messages, means for adopting timing of a fastest mesh point in the network in accordance with the beacon information, means for selecting a beacon interval and DTIM period such that the mesh DTIM period is an integral multiple of the beacon interval, a controller operative to control, administer and manage the radio, the PHY module and the MAC and a host interface coupled to the MAC and a host, the host interface operative to interface the host to the WLAN mesh point.

There is also provided in accordance with the invention, a wireless local area network (WLAN) mesh point for use in a WLAN mesh network incorporating a plurality of mesh points and having a mesh delivery traffic indication message (DTIM) period comprising a radio coupled to an antenna for transmitting and receiving radio frequency (RF) signals, a physical layer (PHY) module coupled to the radio, a medium access controller (MAC) coupled to the PHY module and operative to control communications to and from the PHY, the MAC comprising synchronization means for synchronizing the mesh point with the mesh network, the synchronization means comprising means for receiving beacon information messages at a mesh point from one or more neighboring mesh points, means for extracting beacon information associated with the neighbor mesh points from the beacon information messages, means for adopting timing of a fastest mesh point in the network in accordance with the beacon information, means for verifying receipt of beacons generated by the mesh point at the neighboring mesh points, means for selecting a new target beacon transmission time (TBTT) offset that is not in use by other mesh points such that the mesh DTIM period remains an integral multiple of the beacon interval if beacons generated by the mesh point are not being received at one or more neighboring mesh points, a controller operative to control, administer and manage the radio, the PHY module and the MAC and a host interface coupled to the MAC and a host, the host interface operative to interface the host to the WLAN mesh point.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
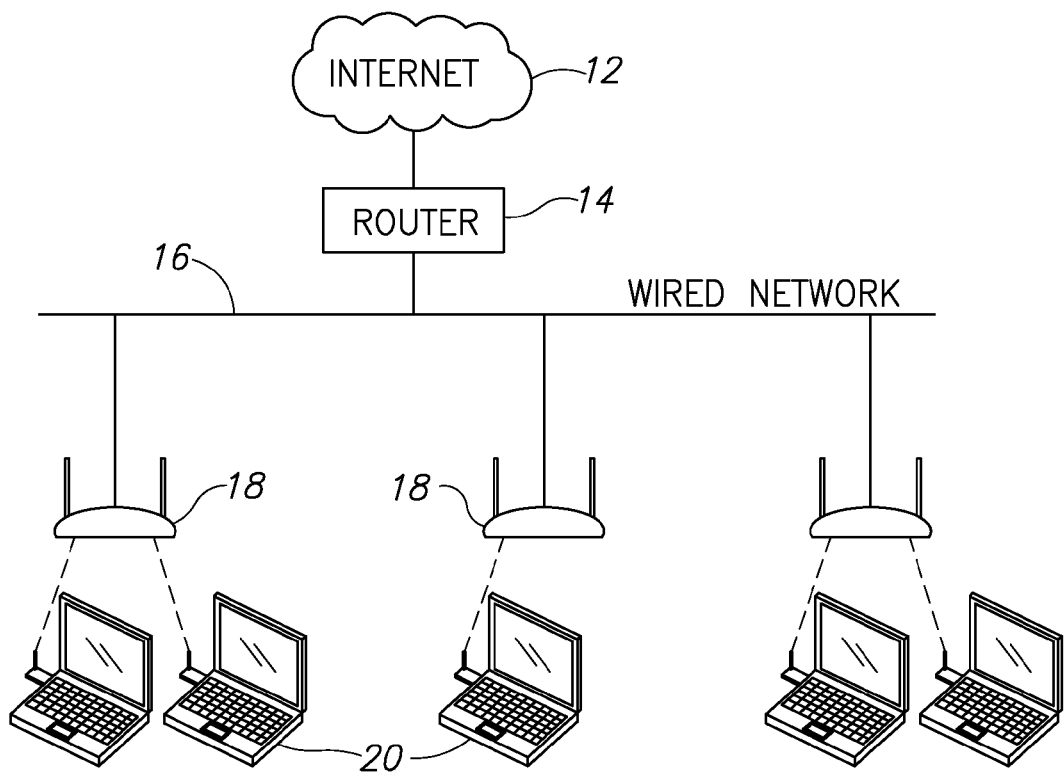
FIG. 1 is a block diagram illustrating an example prior art legacy wireless network.
Figure 2:
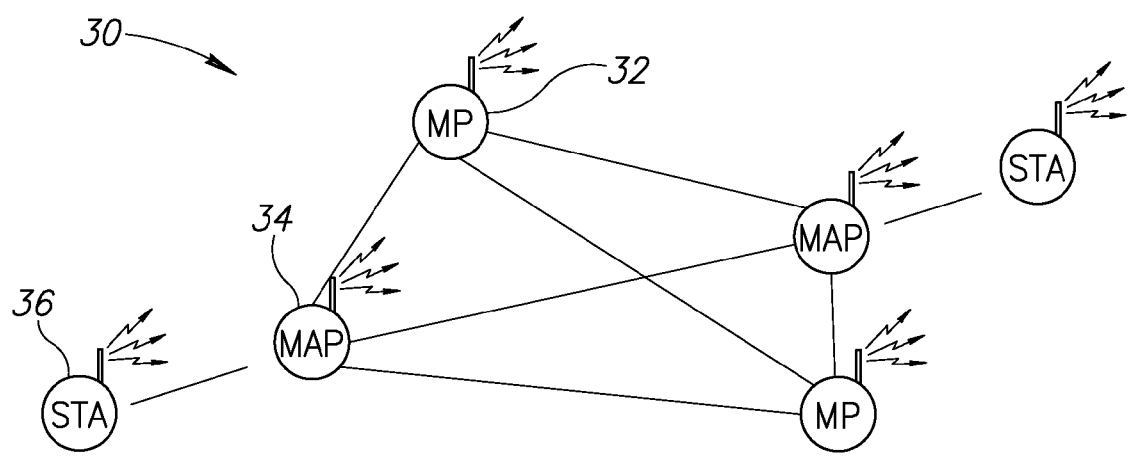
FIG. 2 is a block diagram illustrating an example WLAN mesh network.
Figure 3:
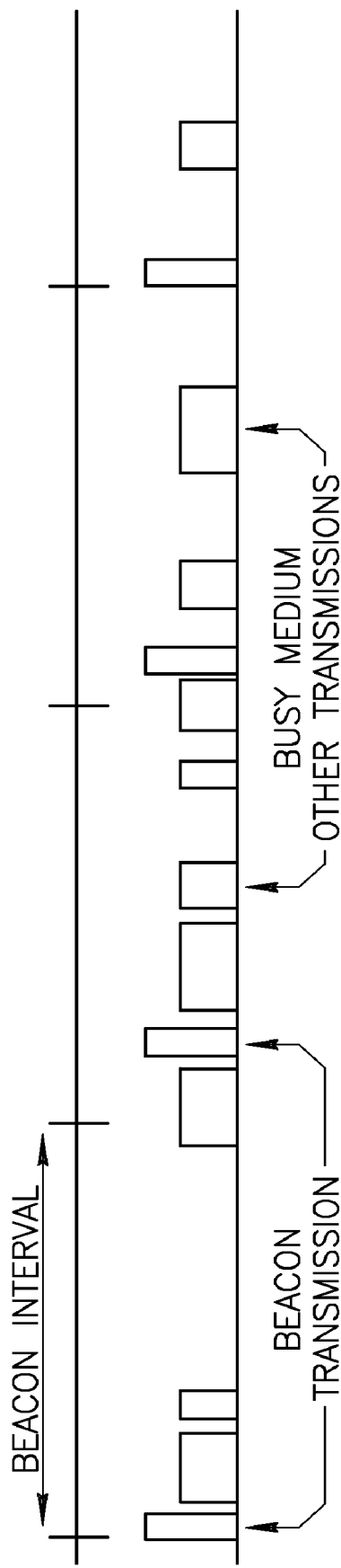
FIG. 3 is a block diagram illustrating beacon transmission in a busy network.

The following notation is used throughout this document.

| Term | Definition |
| --- | --- |
| AC | Alternating Current |
| AP | Access Point |
| ASIC | Application Specific Integrated Circuit |
| ATIM | Ad Hoc Traffic Indication |
| BB | Beacon Broadcaster |
| BSS | Basic Service Set |
| CCA | Clear Channel Assessment |
| CCK | Complementary Code Keying |
| CFP | Contention Fee Period |
| DRAM | Dynamic Random Access Memory |
| DS | Distribution System |
| DSP | Digital Signal Processor |
| DTIM | Delivery Traffic Indication Message |
| EDGE | Enhanced Data Rates For Global Evolution |
| EEPROM | Electrically Erasable Programmable Read Only Memory |
| ESS | Extended Service Set |
| FPGA | Field Programmable Gate Array |
| HDL | Hardware Description Language |
| IBSS | Independent Basic Service Set |
| ID | Identification |
| IE | Information Element |
| IEEE | Institute Of Electrical And Electronic Engineers |
| IF | Intermediate Frequency |
| LAN | Local Area Network |

-continued

| Term | Definition |
| --- | --- |
| MAC | Medium Access Controller |
| MAP | Mesh Access Point |
| MP | Mesh Point |
| MSDU | MAC Service Data Unit |
| OFDM | Orthogonal Frequency Division Multiplexing |
| OSI | Open Systems Interconnect |
| PCI | Personal Computer Interconnect |
| PDA | Personal Data Assistant |
| PIFS | Point Interframe Space |
| PS | Power Save |
| QOS | Quality Of Service |
| RF | Radio Frequency |
| SDI | Serial Digital Interface |
| SDIO | Secure Digital I/O |
| SRAM | Static Random Access Memory |
| STA | Station |
| TBTT | Target Beacon Transmission Times |
| TSF | Timing Synchronization Function |
| TU | Timing Units |
| TXOP | Transmission Opportunity |
| USB | Universal Serial Bus |
| UWB | Ultra Wideband |
| WAN | Wide Area Network |
| WCDMA | Wideband Code Division Multiple Access |
| WDS | Wireless Distribution System |
| WLAN | Wireless Local Area Network |

DETAILED DESCRIPTION OF THE INVENTION

The present invention provides a solution to the problems of the prior art by providing a novel and useful synchronization mechanism that functions to provide a uniform time base for mesh points in a WLAN mesh based network. The synchronization mechanism also enables the mesh points to avoid collisions in the generation and transmission of beacons. The invention is described in the context of a WLAN mesh point but may be applied to other standards and protocols including both wireless and wired.

The synchronization and collision avoidance mechanism is intended to be used in devices that implements the IEEE 802.11s ESS mesh network extensions standard. To aid in understanding the principles of the present invention, the description of the synchronization and collision avoidance mechanism is provided, in one example embodiment, in the context of a WLAN device constructed to function as a mesh point in a WLAN mesh based network.

It is appreciated by one skilled in the art, however, that the synchronization and collision avoidance mechanism of the present invention is not limited for use with any particular communication standard (wireless or otherwise) and can be adapted for use with numerous wireless (or wired) communications standards such as EDGE, extended data rate Bluetooth, WCDMA, Wireless LAN (WLAN), Ultra Wideband (UWB), coaxial cable, radar, optical, etc. Further, the invention is not limited for use with a specific PHY or radio type but is applicable to other compatible technologies as well.

Note that throughout this document, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

A WLAN mesh is defined as an IEEE 802.11-based wireless distribution system (WDS) that is part of a distribution system (DS) comprising a set of two or more mesh points interconnected via IEEE 802.11 links and communicating via the WLAN mesh services. A WLAN mesh may support zero or more entry points (i.e. mesh portals), automatic topology learning and dynamic path selection (including across multiple hops). WLAN mesh services are defined as the set of services provided by the WLAN mesh that support the control, management and operation of the WLAN mesh, including the transport of MAC service data units (MSDUs) between mesh points within the WLAN mesh. A mesh point (MP) is defined as any IEEE 802.11 entity that comprises an IEEE 802.11 conformant MAC and PHY Layer interface to the wireless medium within a WLAN mesh and that supports WLAN mesh services. A mesh AP (MAP) is defined as any mesh point that is also an access point (AP).

Figure 4:
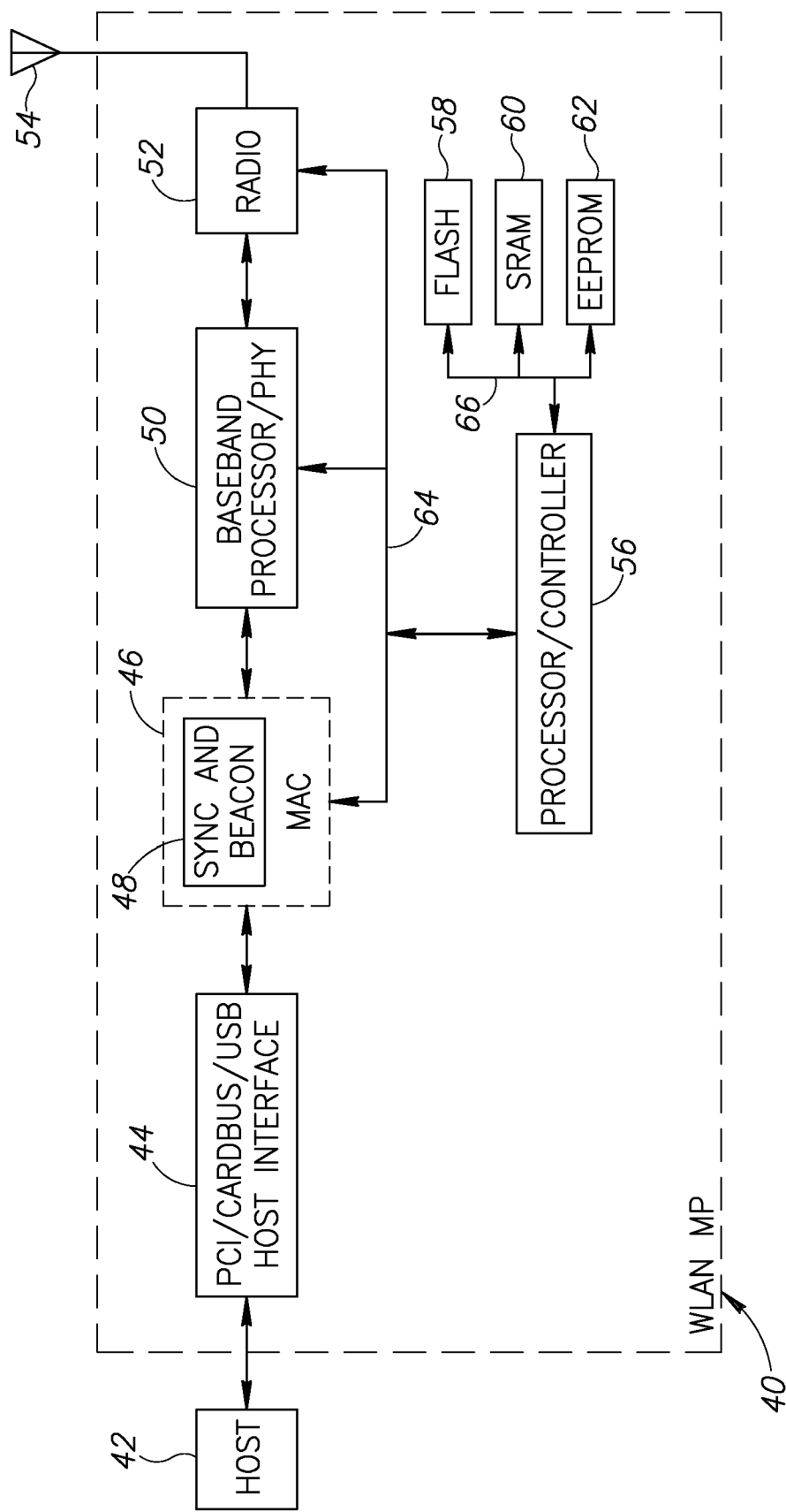
FIG. 4 is a block diagram illustrating an example WLAN mesh point incorporating the synchronization and collision avoidance mechanism of the present invention.

A block diagram illustrating an example WLAN mesh point incorporating the synchronization and collision avoidance mechanism of the present invention is shown in FIG. 4. The WLAN mesh point, generally referenced 40, comprises a host interface 44 for interfacing the WLAN to a host entity 42. The host may comprise any suitable computing device such as a PDA, laptop computer, desktop computer, handheld telecommunications device, etc. The host interface may be adapted to communicate with the host in any manner. Typically, the host interface is adapted to communicate via a standard interface including, but not limited to, PCI, CardBus, USB, SDIO, SDI, etc.

The medium access controller (MAC) 46 is operative to provide Layer 2 functionality (OSI model). The MAC handles communications and implements the protocol between the host and the PHY Layer 1 hardware. The baseband processor/PHY module 50 implements the Layer 1 functionality (OSI model). The PHY performs modulation and demodulation of data (i.e. OFDM in the case of WLAN 802.11a or 802.11g, or Barker and CCK in the case of 802.11b). In addition, the PHY also performs analog to digital conversion, digital to analog conversion, carrier sensing and handles the transmission and reception of frames. The radio module 52, coupled to antenna 54, functions to perform the radio frequency (RF) processing including upconversion from intermediate frequency (IF), downconversion from IF, filtering and amplification of the RF signal. Note that alternatively, the radio may perform direct conversion and in this case would not need IF conversion circuitry.

In accordance with the present invention, the synchronization and collision avoidance mechanism is implemented in the MAC portion of the mesh point. The mechanism may be performed entirely in hardware, software or a combination of hardware and software. Alternatively, the mechanism may be implemented entirely in the host or a portion implemented in the host and a portion in the MAC.

The WLAN mesh point also comprises a processor/controller 56, flash memory 58, static random access memory (SRAM) 60 and electrical erasable programmable read only memory (EEPROM) 62. Note that DRAM may be used in place of static RAM. In addition, the mesh point may not comprise any EEPROM memory. The controller 56 is operative to provide management, administration and control to the MAC, PHY and radio modules via bus 64. The controller is also in communication with the Flash, SRAM and EEPROM memories via a separate memory bus 66 or via a single bus 64 shared by all the modules and memory devices.

Synchronization

Synchronization and beacon generation services in a WLAN mesh are based upon the procedures defined in Section 11.1 of the IEEE 802.11-1999 specification for Infrastructure and IBSS modes of operation, the entire specification being incorporated herein by reference. A MP may or may not support synchronization. An MP supporting synchronization can choose to be either synchronizing or unsynchronizing based on either its own requirements or the requirements of its peers. The synchronizing behavior for these two classes is defined as follows.

An unsynchronizing MP maintains an independent TSF timer and does not update the value of its TSF timer based on time stamps and offsets received in beacons or probe responses from other MPs. An unsynchronizing MP starts its TSF timer independently of other MPs. A MP that supports synchronization can elect to be an unsynchronizing MP if it is communicating with peers that are not requesting synchronization.

A synchronizing MP updates its timer based on the time stamps and offsets received in beacons and probe responses from other synchronizing MPs. Synchronizing MPs maintain a common TSF time called the Mesh TSF time. A MAP maintains the mesh TSF in terms of its TSF timer and its self TBTT offset such that the sum of the self TSF timer and the self TBTT offset equals the mesh TSF time. All beacons and probe responses by MAPs include the Beacon Timing IE to advertise its self offset value relative to the Mesh TSF time.

Synchronizing MPs translate the received time stamps and offsets from beacons and probe responses from other synchronizing MPs to their own timer base and update their timer in accordance with the following.

$$\text{translated\_time\_stamp} = \text{received\_time\_stamp} + \text{received\_offset} - \text{receiver\_offset}; \quad (1)$$

A synchronizing MP adopts the translated time stamp as its own if it is later than its own timer value as is known for the IBSS mode of synchronization. Thus, the mesh point adopts the timing of the mesh point that sent the beacon if it is faster than its own timing. In this manner, ultimately all the mesh point will adopt the timing of the fastest mesh point in the mesh network (i.e. the mesh point with the fastest clock).

Alternatively, synchronizing MPs can update their offsets instead of their timers. The offset update process in this case is as below.

if (received_time_stamp+received_offset)>(self_time+ self_offset) then new_self_offset_value=received_time_stamp+received_offset-self_time;

Note that the received_offset is the self_offset in the Beacon Timing Information Element (IE) (described in more detail infra) received from the neighboring MP and that the receiver_offset is the self offset of the receiving MP.

A synchronizing MP may or may not request synchronization from its peers. However, if an MP requests synchronization from its peers, it must be a synchronizing MP at that time. Initially, an MP may be in an unsynchronized state, but it switches to a synchronized state and vice-versa based on either its own requirements or the requirements of peers.

Neighbor List Information Element (IE)

In accordance with the invention, the neighbor list IE is used by an MP to advertise its neighbor list, the beacon offsets of itself and its neighbors and the power save state of itself and its neighbors. The neighbor list IE also comprises a list of MAC addresses and information about the neighbor beacon timing and power save state.

Figure 5:
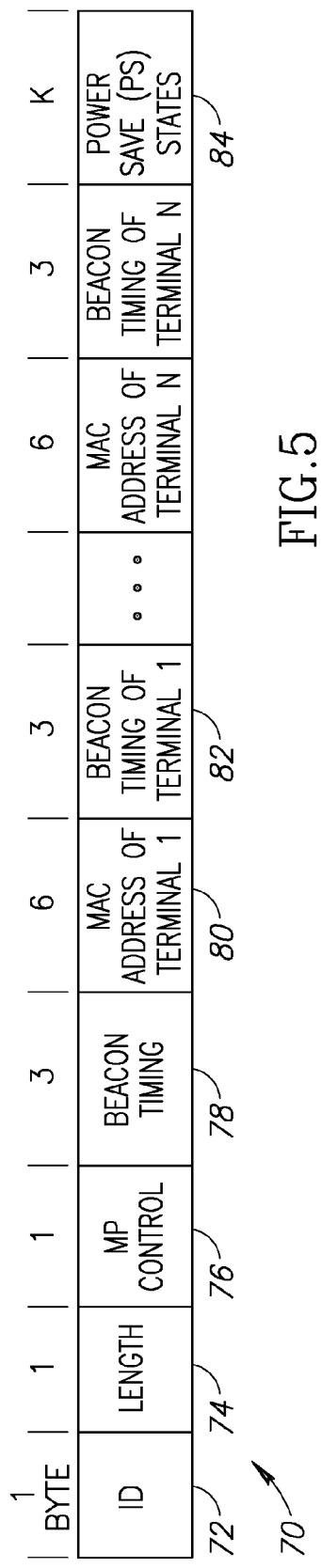
FIG. 5 is a diagram illustrating the frame format for a neighbor list information element (IE) provided in accordance with the present invention.

A diagram illustrating the frame format for a neighbor list information element (IE) provided in accordance with the present invention is shown in FIG. 5. The format of the neighbor list IE, generally referenced 70, comprises an ID field 72, length field 74, MP control field 76, beacon timing field 78, N instances of a terminal MAC address field 80 and a beacon timing field 82, and a power save states field 84.

Figure 6:
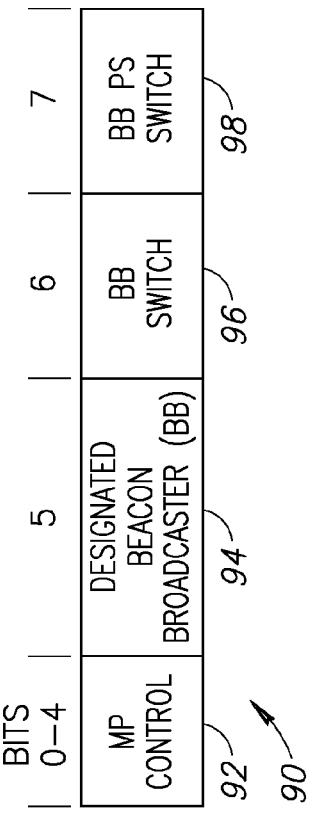
FIG. 6 is a diagram illustrating the frame format for the mesh point control field portion of the neighbor list information element (IE) of FIG. 5 as provided in accordance with the present invention.

Terminals 1 through N denote the N terminals as seen by the MP generating the neighbor list IE. The MAC address fields indicate the MAC of the current neighbor list of the MP/IBSS/STA node. The MP control field is shown in more detail in FIG. 6.

The frame format, generally referenced 90, for the mesh point control field portion of the neighbor list information element (IE) of FIG. 5 comprises a reserved field 92, a designated beacon broadcaster (BB) field 94, a BB switch field 96 and a BB power save (PS) state field 98. The designated BB field is adapted to indicate that the current beacon broadcaster is a designated beacon broadcaster that operates in accordance with the scheme described infra.

The BB switch field is adapted to indicate the change of the designated beacon broadcaster. if the bit is set to 1, the next beacon is sent by the MP whose MAC address is the first one in the neighbor list.

The BB PS state field is adapted to indicate whether the beacon broadcaster is using power save mode. If the BB PS bit is set to 1, then the beacon broadcaster is in the power save state. If the BB PS state bit is set to 0, then the beacon broadcaster is awake.

Figure 7:
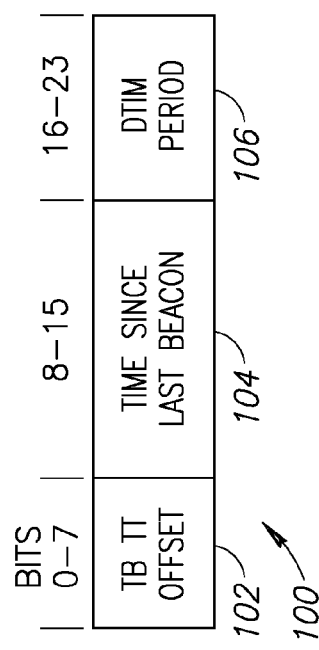
FIG. 7 is a diagram illustrating the frame format for the beacon timing field portion of the neighbor list information element (IE) of FIG. 5 as provided in accordance with the present invention.

A diagram illustrating the frame format for the beacon timing field portion of the neighbor list information element (IE) of FIG. 5 is shown in FIG. 7. The frame format, generally referenced 100, of the beacon timing field comprises a TBTT offset field 102, a time since last beacon field 104 and a DTIM period field 106. The TBTT offset field indicates the TBTT offset used by the MP for its own beacon transmission and for its TSF timestamps as compared to the mesh TSF. The offset is measured in TUs.

The 'time since last beacon' field indicates the time that has passed since the last beacon was received by the MP sending the beacon from that particular MP (i.e. MP terminal 'X'). The time is measured in DTIM periods.

The DTIM period field indicates the DTIM period of that particular MP (i.e. the number of beacon intervals making up a single DTIM interval).

The PS states field indicates the current power save state of each neighbor list member. each bit of the field indicates the power save state of the corresponding neighbor list member. Conversely, if a bit is set to 0, then the corresponding neighbor list member is in the awake state and if a bit is set to 1, the corresponding bit is in the power save state. For example, if the neighbor list element comprises eight MAC addresses and the value of the PS states field is '00110001', then the MPs with MAC addresses in positions 3, 4 and 8 in the neighbor list are in the power save state. Note that the PS state field length is always an integer number of bytes.

Mesh Beaconing

Beaconing is used in a mesh in order to aid in synchronization as well as advertising of node capabilities and states. An MP may choose to beacon either as defined in the IBSS mode or as defined in the infrastructure mode of operation as described in the 802.11 and 802.11E standards. Unsynchronizing MPs generate beacons according to the beacon generation procedures defined in Section 11.1.2.1 of 802.11. Unsynchronizing MPs choose their own beacon interval and TSF independent of other MPs. Unsynchronizing MPs optionally implement beacon collision avoidance as defined infra to reduce the chances that it will transmit beacons at the same time as one of its neighbors. Unsynchronizing MAPs treat any associated non-AP MPs and neighboring LW-MPs operating in PS mode identical to legacy STAs (i.e. the MAP assumes that the MPs will wake up for the BSS DTIM beacon of the MAP in PS operations).

Synchronizing MAPs generate beacons according to the beacon generation procedures described in Section 11.1.2.1 of 802.11. The value of the aBeaconPeriod attribute used by synchronizing MAPs equals a sub-multiple of the Mesh DTIM interval. Synchronizing MAPs use and advertise a non-zero self TBTT offset value using the Beacon Timing field described infra.

Thus, each MP is permitted to select its own beacon interval but all MPs must share a common mesh DTIM interface. The mesh DTIM interval is always an integral multiple of the beacon interval of an MP. The mesh DTIM interval is obtained by multiplying the beacon interval with the MP DTIM period. An MP that established a mesh gets to select its beacon interval and the mesh DTIM interval of its choice and thus establishes the DTIM interval timing for the entire mesh network.

An MP that joins an already established mesh must adopt the mesh DTIM interval of the mesh. The MP may, however, select values of the beacon interval and MP DTIM period different from the ones advertised by MPs belonging to the mesh. In all cases, however, the multiplication of these two values (i.e. beacon interval and MP DTIM period) must match the mesh DTIM interval. For example, consider a mesh DTIM interval of 300 time units (TUs). An MP that selects an MP DTIM period of 3 will have a beacon period of 100 TUs. Note that beacon broadcasting within a mesh rotates among the MPs.

Figure 8:
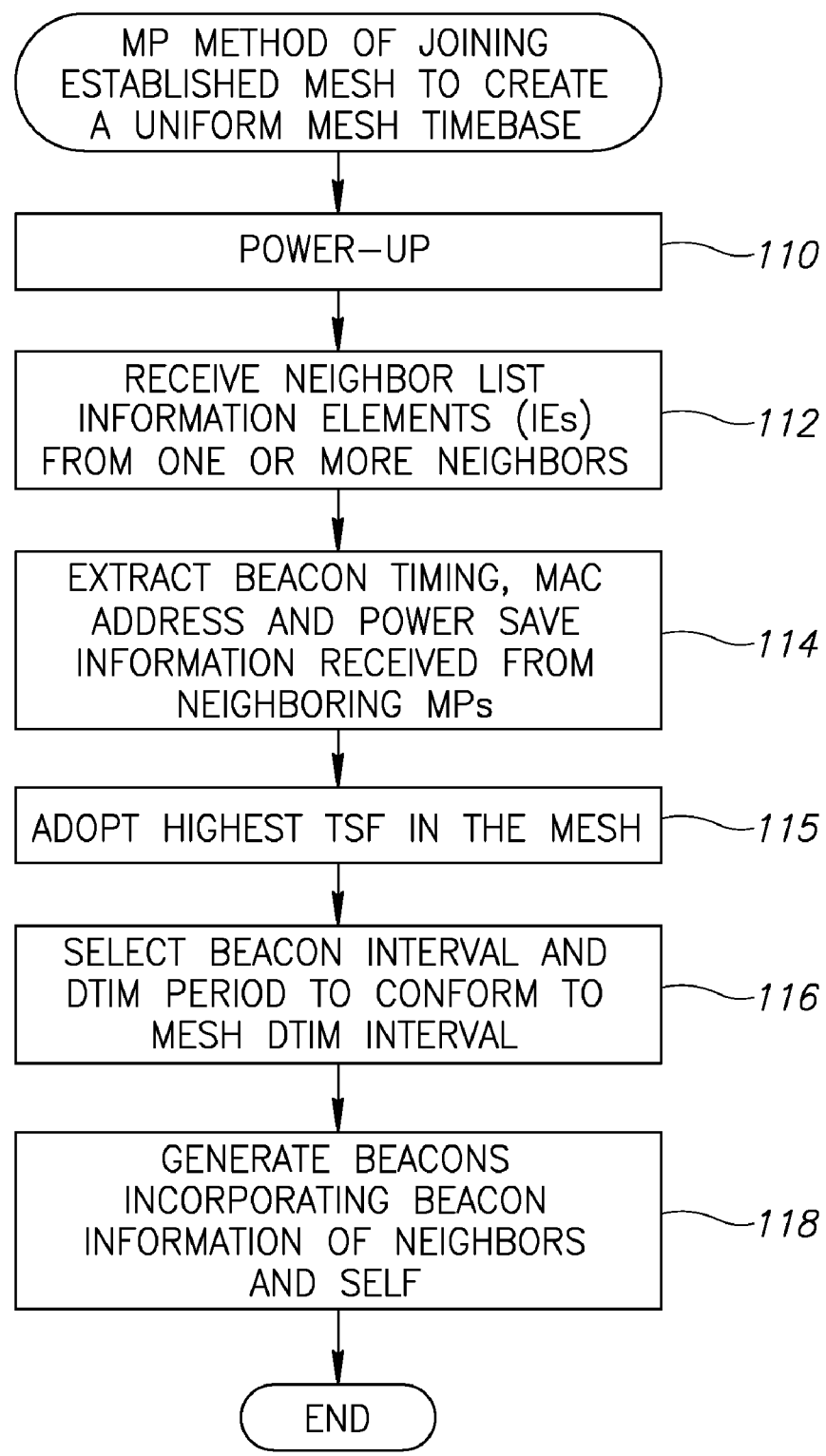
FIG. 8 is a flow diagram illustrating the mesh point method of the present invention of joining an established mesh to create uniform mesh timing.

A flow diagram illustrating the mesh point method of the present invention of joining an established mesh to create uniform mesh timing is shown in FIG. 8. Soon after an MP powers-up (step 110), it begins to receive neighbor list IEs from one or more neighbors (step 112). The MP extracts beacon timing, MAC address and power save information from the neighbor list IEs received from neighbor MPs (step 114). The MP then adopts the timing of the highest TSF in the mesh in accordance with the technique described supra (step 115). Based on the beacon information received, the MP selects a beacon interval (i.e. TBTT offset) and DTIM period that conforms to the mesh DTIM period (step 116). The MP then begins advertising the TBTT offset and DTIM interval of itself and its neighbors within beacon information fields in the neighbor list IE included within the transmitted beacons (step 118).

Figure 9:
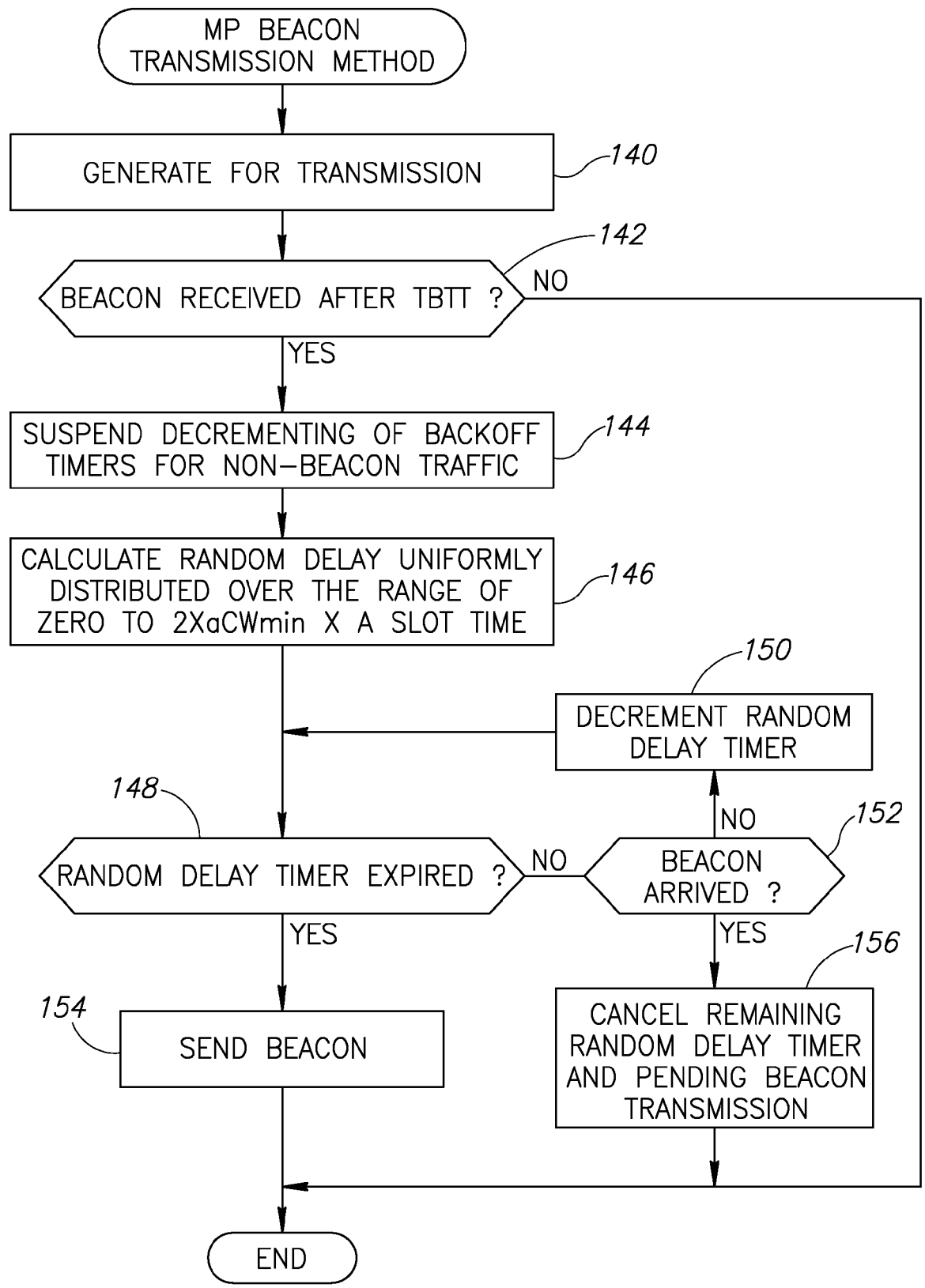
FIG. 9 is a flow diagram illustrating the mesh point beacon transmission method of the present invention.

Synchronizing non-AP MPs generate beacons according to the beacon generation procedures described for IBSS operation in Section 11.1.2.2 of the 802.11 standard and 802.11e draft, unless they are acting as a designated beacon broadcaster (as described infra). A non-AP MP that receives a beacon from an MP with the Mesh ID the same as its own after TBTT and before being able to send its own beacon may cancel that beacon transmission. Specifically, the rules that apply for beacon transmission are presented as a flow diagram in FIG. 9.

The MP first generates a beacon message for transmission (step 140). If the beacon is received after TBTT (step 142), then the decrementing of backoff timers for any non beacon traffic is suspended (step 144). The MP then calculates a random delay uniformly distributed over the range of zero through 2×aCWmin×aSlot time (step 146). The aCWmin is as used for AC_VO. The MP then waits for the expiration of the random period counted down by a random delay timer (step 148) while decrementing the random delay timer using the same algorithm as for back off (step 150). If a beacon with the same mesh ID arrives before the random delay timer expires (step 152), the MP cancels the remaining random timer delay and the pending beacon transmission (step 156). Otherwise, the MP sends the beacon if the random delay has expired and no beacon has arrived during the delay period (step 154).

Note that MAPs serve as both MPs as well as APs. MAPs are adapted to beacon on every beacon interval as part of their AP operation and do not cancel pending beacon transmissions even f another beacon was received on the same TBTT before their random delay timer expires. Optionally, MPs can implement the beacon collision avoidance technique described in more detail infra.

Note also that the Mesh DTIM interval and the BSS DTIM interval in MAPs do not have to be identical. MPs use the DTIM IE to advertise the mesh DTIM interval, whereas the TIM IE is used for advertising the DTIM interval in a BSS. The DTIM period of these IEs do not have to be identical since one will be used for the AP service while the other for the mesh service.

Lightweight MPs (LW-MPs) that support power save (PS) operation use the optional beacon broadcaster approach, described in more detail infra, in order to avoid beacon collisions. An MP operating in power save mode will set its MP DTIM period to one and will therefore attempt to beacon only once every DTIM interval. A lightweight MP can decide not to beacon at all if it is able to detect beacons from other MPs. An MP that opts not to beacon resumes beaconing it is does not receive any beacons for a predetermined number of (e.g., two or three) DTIM intervals.

An unsynchronizing MP intending to enter the power save state becomes a synchronizing MP and requests synchronization from peers prior to leaving the active state. MPs supporting PS operation use the optional designated beacon broadcaster approach described infra.

Designated Beacon Broadcaster

The designated beacon broadcaster approach is used by lightweight MPs that support power save operation. It enables to have a designated MP perform beaconing for a defined period of time while all other MPs defer from sending beacons.

An MP that serves as the designated beacon broadcaster transmits its beacon using the procedure as described for infrastructure AP operation Section 11.1.2.1 of the 802.11-1999 standard (i.e. does not use random backoff).

An MP that supports this option that received at least one beacon from an MP that is marked as a Designated Beacon Broadcaster in the last two Mesh DTIM intervals does not schedule a beacon for transmission.

Change of Beacon Broadcaster (BB)

In accordance with the invention, the beacon broadcaster role is changed periodically. An MP needs to relinquish its role as the designated beacon broadcaster after no more than MAX_CONT_BB mesh DTIM intervals. A suggested value of MAX_CONT_BB is 32.

In every mesh DTIM interval, the current beacon broadcaster sets the BB switch bit to 1 if it wants to change the beacon broadcaster. In this case, the neighbor that is first in the neighbor list acting as the beacon broadcaster and sends the next mesh DTIM beacon.

The BB insures that the neighbor appearing at the head of the list is supporting power save transmission and Designated Beacon broadcasting.

If a neighbor assigned to be the beacon broadcaster fails to transmit its beacon (e.g., shuts down or goes out of range), other MPs will attempt to take over its role. MPs supporting the deterministic beacon broadcasting begin attempting to send beacons using the standard backoff procedure with a neighbor list IE designating itself as the BB if it does not receive a predetermined number (e.g., three) of consecutive beacons from the last designated BB. If another MP already transmitted a Beacon with a neighbor list IE designating itself as the BB, then the MP cancels its pending beacon.

Mesh Beacon Collision Avoidance Mechanism

The present invention provides a mechanism to reduce the chances of a collision in the transmission of beacons by multiple MPs. Each MP adjusts its TSF timer to reduce the chances that they will transmit beacons at the same time as one of their neighbors. Individual MPs take steps either prior to, or during association, with a WLAN mesh to select a TBTT that does not conflict with its mesh neighbors. Any MP that is a member of a WLAN mesh may adjust its TBTT to better accommodate other members of the mesh. This functionality is particularly important for MAPs that need to beacon on every TBTT. An MP adjusts its TSF timer if it discovers that its TBTT repeatedly collides with the TBTT of a neighbor MP. Options a MP has for adjusting its TSF include advancing or suspending the TSF for a period of time.

The adjustment of the TBTT is based on a fixed offset from the mesh TSF as measured in TUs. The MP selects an offset so as to (1) avoid using an offset that is already being used by other MPs and to (2) maintain a separation of at least a TXOP between its beacons and beacons of other MPs.

MPs derive TBTT offset information of its neighbors and the neighbors of its neighbors from the beacon timing field portions of the neighbor list IE included in beacons and probe responses. An MP collects and reports information about the TBTT offsets of neighboring synchronizing MAPs and unsynchronizing MPs using a variety of techniques. The following describes options to receive such information from neighboring MPs.

In a first option, information from synchronizing neighbors MPs that are synchronizing collect the beacon timing information of their neighbors and report it through the beacon timing field of the neighbor list IE. This IE is transmitted in selected beacons and in action frames responding to requests for such information. Synchronizing MPs choose a frequency to include the beacon timing information in their beacons.

Beacon timing information can also be requested via action frames with the response through the beacon timing field in action frames. The action frame approach is especially useful for use by synchronizing MAPs to proactively detect and avoid beacon collisions. Synchronizing MPs respond to requests for such information using the beacon timing field. Synchronizing non-AP MPs, when using the beacon timing field, set the self TBTT offset field in the self beacon timing field to 0.

In a second option, information from unsynchronizing neighbors unsynchronizing MPs optionally collect and report beacon timing information of their neighbors. Since unsynchronizing MPs do not track the mesh TSF, they report beacon time offsets relative to their self TSF. This information is either periodically transmitted in beacons or is transmitted based on a request response approach through action frames. The beacon timing field is used to report this information in beacons as well as in action frames as a response to request action frames. The self beacon timing field is set to all zeros in this case.

As an option, synchronizing MAPs occasionally delay their beacons after their TBTTs for a random time. The random delay is chosen so that the transmission time is interpreted by the MAP as not colliding with other beacons. This behavior further helps in discovery of neighbors through beacons in case they choose colliding offsets. The collision avoidance mechanism described herein may then be used for choosing non-colliding offsets, in case any colliding offsets are observed.

Figure 10:
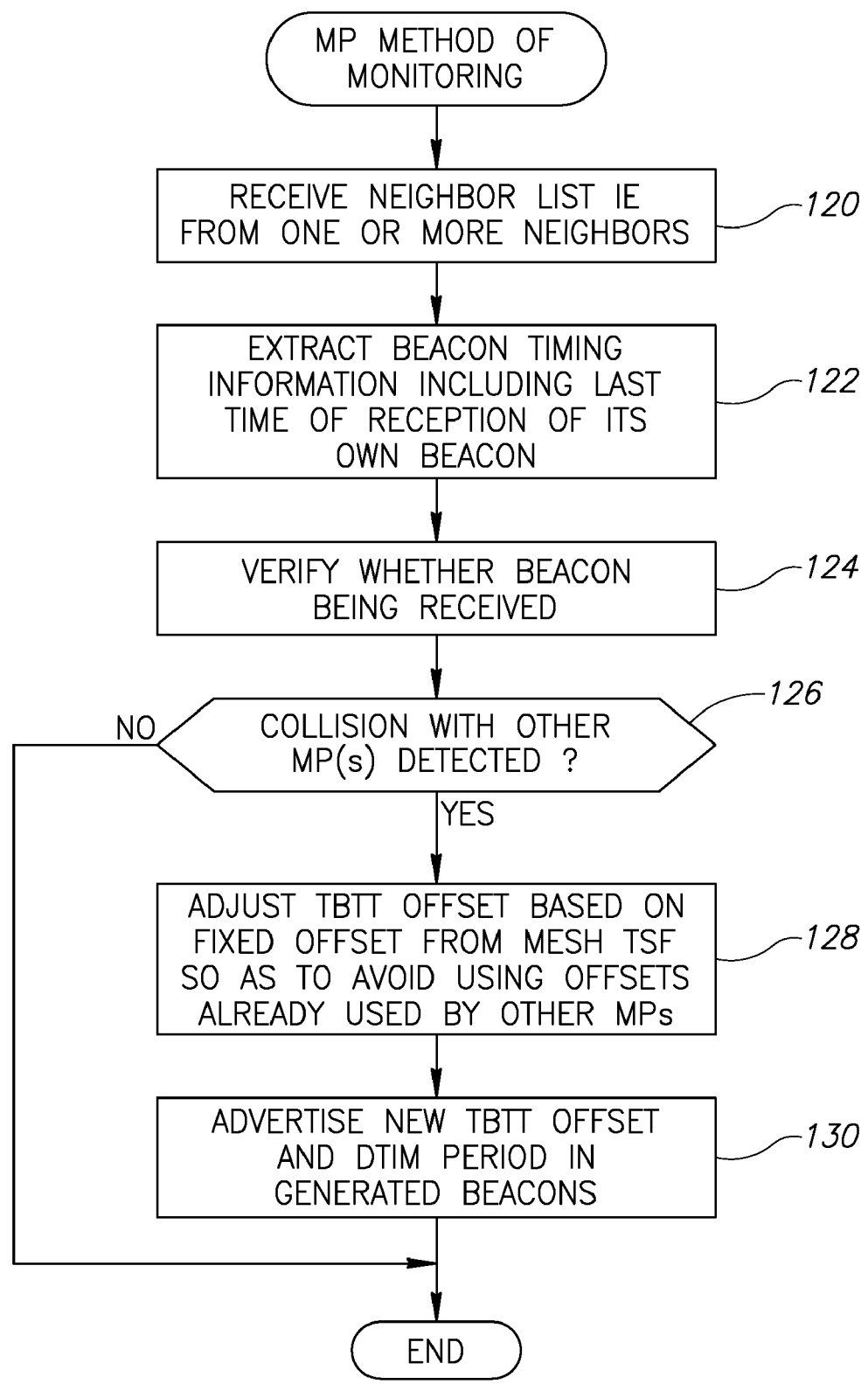
FIG. 10 is a flow diagram illustrating the mesh point method of monitoring neighboring mesh points in accordance with the present invention.

A flow diagram illustrating the mesh point method of monitoring neighboring mesh points in accordance with the present invention is shown in FIG. 10. Each MP monitors the neighbor list IE received in beacons from one or more neighbors (step 120). Beacon timing information is extracted from the neighbor list IEs received including information regarding the last time of beacon reception of that particular MP's beacons (step 122). The MP then verifies that its beacons are being received and not in collision with beacons from other MPs (step 124). If an MP suspects that its beacons are not being heard due to a collision with other MP(s) (step 126), that MP modifies its TBTT offset from the mesh TSF using the procedure described for infrastructure AP operation Section 11.1.2.1 in the 802.11 standard (i.e. does not use random backoff) so as to avoid using offsets already in use by other MPs (step 128). The MP then starts using the new TBTT offset and advertises it along with the DTIM interval in its beacons (step 130). Note that the actual mesh TSF is derived by adding the TBTT offset value to the TSF advertised in the beacon frames.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of synchronization in a wireless local area network (WLAN) mesh network incorporating a plurality of mesh points and having a mesh delivery traffic indication message (DTIM) period, said method comprising the steps of:

receiving beacon information messages at a mesh point from one or more neighboring mesh points;

extracting beacon information associated with said neighbor mesh points from said beacon information messages, wherein said beacon information comprises a target beacon transmission time (TBTT) offset compared to the mesh timing synchronization function (TSF);

adopting timing of a fastest mesh point in said network in accordance with said beacon information; and selecting a beacon interval and DTIM period such that said mesh DTIM period is an integral multiple of said beacon interval.

2. The method according to claim 1, further comprising the step of generating beacon messages incorporating beacon information associated with one or more neighbors of said mesh point.

3. The method according to claim 1, further comprising the step of generating beacon massages incorporating beacon information associated with said mesh point.

4. The method according to claim 1, wherein said beacon information is transmitted by mesh points encapsulated in a neighbor list information element.

5. The method according to claim 1, wherein said beacon information further comprises a time since the last reception of a beacon from that particular mesh point.

6. The method according to claim 1, wherein said beacon information further comprises a DTIM period of that particular mesh point.

7. The method according to claim 1, wherein said beacon information messages comprise a power save states field adapted to indicate the current power save state of each neighbor listed in said beacon information message.

8. The method according to claim 1, wherein said DTIM period comprises a single value for all mesh points in said network.

9. A method of synchronization in a wireless local area network (WLAN) mesh network incorporating a plurality of mesh points and having a mesh delivery traffic indication message (DTIM) period, said method comprising the steps of:
receiving beacon information messages at a mesh point from one or more neighboring mesh points, wherein said beacon information messages comprise mesh point control information which comprises a designated beacon broadcaster field adapted to indicate that the current beacon broadcaster is a designated beacon broadcaster;
extracting beacon information associated with said neighbor mesh points from said beacon information messages
adopting timing of a fastest mesh point in said network in accordance with said beacon information; and
selecting a beacon interval and DTIM period such that said mesh DTIM period is an integral multiple of said beacon interval.

10. A method of synchronization in a wireless local area network (WLAN) mesh network incorporating a plurality of mesh points and having a mesh delivery traffic indication message (DTIM) period, said method comprising the steps of:
receiving beacon information messages at a mesh point from one or more neighboring mesh points, wherein said beacon information messages comprise mesh point control information which comprises a beacon broadcaster switch field adapted to indicate a change in the designated beacon broadcaster;
extracting beacon information associated with said neighbor mesh points from said beacon information messages
adopting timing of a fastest mesh point in said network in accordance with said beacon information; and
selecting a beacon interval and DTIM period such that said mesh DTIM period is an integral multiple of said beacon interval.

11. A method of synchronization in a wireless local area network (WLAN) mesh network incorporating a plurality of mesh points and having a mesh delivery traffic indication message (DTIM) period, said method comprising the steps of:
receiving beacon information messages at a mesh point from one or more neighboring mesh points, wherein said beacon information messages comprise mesh point control information which comprises a beacon broadcaster power save state field adapted to indicate whether the beacon broadcaster is using a power save mode of operation;
extracting beacon information associated with said neighbor mesh points from said beacon information messages
adopting timing of a fastest mesh point in said network in accordance with said beacon information; and
selecting a beacon interval and DTIM period such that said mesh DTIM period is an integral multiple of said beacon interval.

12. A method of synchronization and collision avoidance in a wireless local area network (WLAN) mesh network incorporating a plurality of mesh points and having a mesh delivery traffic indication message (DTIM) period, said method comprising the steps of:
receiving beacon information messages at a mesh point from one or more neighboring mesh points;
extracting beacon information associated with said neighbor mesh points from said beacon information messages;
adopting timing of a fastest mesh point in said network in accordance with said beacon information;
verifying receipt of beacons generated by said mesh point at said neighboring mesh points;
if beacons generated by said mesh point are not being received at one or more neighboring mesh points, selecting a new target beacon transmission time (TBTT) offset that is not in use by other mesh points such that said mesh DTIM period remains an integral multiple of said beacon interval; and
advertising said new target beacon transmission time (TBTT) offset in beacon information messages generated by said mesh point.

13. The method according to claim 12, wherein said beacon information is transmitted by mesh points encapsulated in a neighbor list information element.

14. The method according to claim 12, wherein said beacon information comprises a time since the last reception of a beacon from that particular mesh point.

15. The method according to claim 12, wherein said beacon information comprises a DTIM period of that particular mesh point.

16. The method according to claim 12, wherein said beacon information messages comprise mesh point control information.

17. The method according to claim 16, wherein said mesh point control information comprises a beacon broadcaster switch field adapted to indicate a change in the designated beacon broadcaster.

18. The method according to claim 16, wherein said mesh point control information comprises a beacon broadcaster power save state field adapted to indicate whether the beacon broadcaster is using a power save mode of operation.

19. The method according to claim 12, wherein said beacon information messages further comprise a power save states field adapted to indicate the current power save state of each neighbor listed in said beacon information message.

20. The method according to claim 12, wherein said DTIM period comprises a single value for all mesh points in said network.

21. A method of synchronization and collision avoidance in a wireless local area network (WLAN) mesh network incorporating a plurality of mesh points and having a mesh delivery traffic indication message (DTIM) period, said method comprising the steps of:

receiving beacon information messages at a mesh point from one or more neighboring mesh points, wherein said beacon information messages comprise mesh point control information which comprises a designated beacon broadcaster field adapted to indicate that the current beacon broadcaster is a designated beacon broadcaster;

extracting beacon information associated with said neighbor mesh points from said beacon information messages;

adopting timing of a fastest mesh point in said network in accordance with said beacon information;

verifying receipt of beacons generated by said mesh point at said neighboring mesh points;

if beacons generated by said mesh point are not being received at one or more neighboring mesh points, selecting a new target beacon transmission time (TBTT) offset that is not in use by other mesh points such that said mesh DTIM period remains an integral multiple of said beacon interval.

* * * * *